Sept. 16, 1969     E. G. HUMPHRIES     3,466,859
HARVESTER

Filed Jan. 30, 1967     8 Sheets-Sheet 1

INVENTOR
ERVIN G. HUMPHRIES
BY Stowell & Stowell
ATTORNEY

Sept. 16, 1969　　　E. G. HUMPHRIES　　　3,466,859
HARVESTER

Filed Jan. 30, 1967　　　　　　　　　　　　8 Sheets-Sheet 2

Sept. 16, 1969     E. G. HUMPHRIES     3,466,859
HARVESTER

Filed Jan. 30, 1967     8 Sheets-Sheet 4

INVENTOR.
ERVIN G. HUMPHRIES
BY Stowell & Stowell

ATTORNEYS

Sept. 16, 1969 E. G. HUMPHRIES 3,466,859
HARVESTER
Filed Jan. 30, 1967 8 Sheets-Sheet 7

INVENTOR
ERVIN G. HUMPHRIES
BY Stowell & Stowell
ATTORNEY

United States Patent Office 3,466,859
Patented Sept. 16, 1969

3,466,859
HARVESTER
Ervin G. Humphries, Raleigh, N.C., assignor to Research Corporation, New York, N.Y., a nonprofit corporation of New York
Filed Jan. 30, 1967, Ser. No. 612,418
Int. Cl. A01d 45/00
U.S. Cl. 56—327                                    8 Claims

ABSTRACT OF THE DISCLOSURE

A harvesting machine for vine growing fruit having a rod which is brought into contact with the fruit to knock the fruit from the vine with a minimum of damage to the vine and fruit.

OBJECTS OF INVENTION

It is a principal object of the present invention to provide a unique harvesting machine for vine growing fruit and in particular cucumbers which must be harvested a number of times during their normal growing season.

It is a particular object of the present invention to provide such a machine wherein fruit is removed from the vine with a minimum of disturbance and damage to the vines.

It is another object of the present invention to provide such a device which is adapted for row harvesting of vine growing fruit such as cucumbers and wherein the harvested fruit is automatically elevated into storage means supported by the harvesting apparatus.

Another object of the present invention is to provide such a device wherein the picking means comprise bars or rods stationary with respect to the harvesting machine.

Another object is to provide a harvesting machine having stationary picker bars, the diameters of which determine to a substantial extent the size of the fruit to be harvested.

These and other objects and advantages are generally provided in a harvester for vine growing fruit comprising a main frame consisting of a pair of laterally spaced, generally horizontally disposed bed members, a fruit picking rod for each bed member, each of said picker rods extending from a low forward position adjacent the space between the bed members, generally diagonally across their respective bed members to an upwardly and rearwardly spaced apart position above the bed members.

THE DRAWINGS

The invention will be more particularly described with reference to the accompanying drawings wherein.

DESCRIPTION

Referring to the drawings, 10 generally designates a harvesting machine for vine growing fruit embodying the principles of the present invention. The machine 10, in the illustrated form of the invention, is constructed from a plurality of generally horizontal frame members 12a, b, c, d, etc. forming a base portion for one side of the machine and corresponding horizontal frame members 14a, b, c, and d forming the other side base portion of the machine. These members cooperate with a plurality of generally vertically extending frame members 16a, b, c, d, etc., for one side and 18a b, c, d, etc., for the opposite side of the machine.

Figures 8, 9:
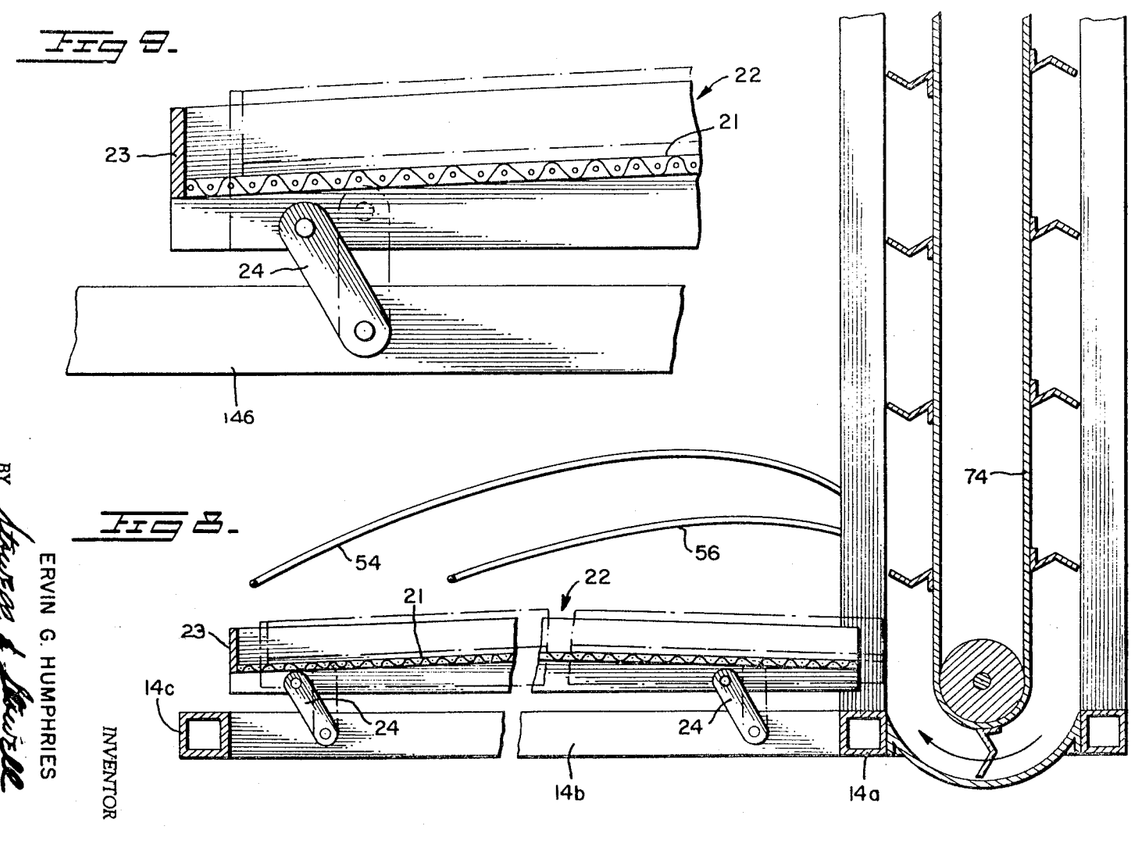
FIGURE 8 is a section on line 8—8 of FIGURE 4.
FIGURE 9 is an enlarged fragmentary view of one support means for one of the bed members.
Figure 10:
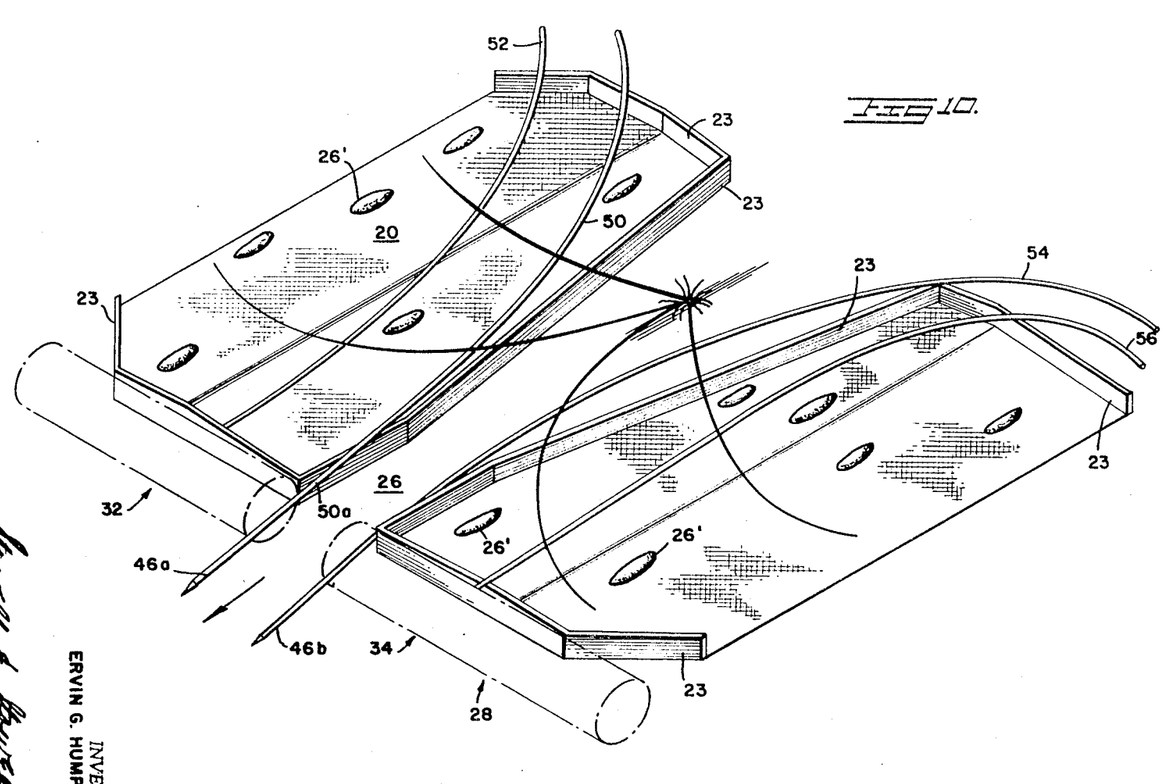
FIGURE 10 is a schematic view of the harvester in operation.

The horizontal members 12a, b, etc., and 14a, b, c, etc., forming the two base portions of the harvester movably support bed members or platforms 20 and 22. Each of the platforms or bed members 20 and 22 is supported for limited reciprocating or rocking motion in a generally horizontal plane by pivot links 24. Each bed member 20 and 22 has a screen or the like surface 21 which is slightly bowed as shown in FIG. 8 to assist in conveying the picked fruit and an upstanding edge portion 23 as more clearly shown in FIG. 10. The edge portion 23 assists in guiding fruit 26′ to the elevator means to be described hereinafter.

The bed members 20 and 22 and their supporting framework are positioned in generally spaced horizontal relationship to provide an open space 26 at the front end 28 of the machine which open space extends throughout the length of the machine. At the forward end an opening approximately 6 inches wide has been found to very satisfactorily permit the passage of the major stem portions of the vine within the slot during movement of the harvester along a row to be harvested. It will be noted that the 6 inch wide opening between the bed members 20 and 22 extends rearwardly from the leading edge approximately 12 inches and then the bed members taper or flare outwardly and rearwardly to provide a rear opening about 20 inches in width.

The vertical frame members 16a and 16b, etc., and 18a, and 18b, etc., support a horizontal beam 30 which, as to be more fully described hereinafter, carries the primary driving mechanism for the harvester. The height of the horizontal beam 30, above the bed members 20 and 22, is such that vines passing over the bed members and through the slot-like opening 26 between the bed members will clear the lower surface of the beam. In general, positioning the beam 30 approximately 18 to 20 inches above the bed members 20 and 22 provides for satisfactory operation.

Mounted at the forward or leading edge of each of the base members of the harvester is a vine pickup roller or brush member generally designated 32 for the side carrying the bed member 20 and 34 for the opposite side. Each of the brush members includes a roller 36 carried by a shaft 38. The inner ends of the shafts are journaled in bearing means generally indicated at 38′ while the outboard ends are journaled in similar bearing means 40. The cylindrical portion 36 of each pickup roller has mounted thereon and extending therefrom brush elements 42 constructed, for example, of fibers stiff enough to pick up vines as the machine is urged forwardly along a row of vines to be harvested and the brush members are rotated.

Extending forwardly of the rotating brush members 32 and 34 are a pair of tines 46a and 46b which slope generally downwardly from the respective beds of the machine to an extent such that when the machine is in operation, the forward ends of the tines will run approximately one half inch under the ground and will initially pick up the vines to deposit them on the front ends of the picker rods in conjunction with the rotating brush members 32 and 34.

The picker rods 50 and 52 for one side of the machine and 54 and 56 for the other side of the machine are fixed to stationary members of the harvester and the only movement thereof, relative to the fruit to be picked, is the motion of the harvester relative to the vine carrying the fruit. Picker rod 50 is attached at its forward end 50a as a continuation of the corresponding tine 46a and the rod curves outwardly, upwardly and rearwardly across its bed member 20 where it is attached, such as by welding to a vertical rod 58 secured to one of the horizontal frame members of the machine. The other rod 52 is connected to the leading edge of the base member of the harvesting machine toward the right side of the machine about 6 inches from the starting position of its cooperating rod 50. Rod 52, like rod 50, slopes generally upwardly, rearwardly and diagonally across its respective bed member 20 and is secured at its rearward end to a further rod 60, carried by one of the frame members of the harvester. The opposite side of the machine has picker rods 54 and 56, said rods being positioned and curved correspondingly to rods 50 and 52. In the preferred embodiment of the invention the rods 50, 52, 54 and 56 are constructed of iron or steel or other suitable rigid material and have a diameter of about ¼ inch.

Further, the rods may be coated with, for example, a plastic composition such as "Teflon" which would have low friction coefficients for the vines to be harvested.

Each side of the harvester is provided with an endless belt type fruit elevating assembly generally designated 62 for one side and 64 for the other side. Each of the elevators is identical in form and elevator 62 consists of a lower idler pulley 66 rotatably mounted on a shaft 68 and an upper driven pulley 70 fixed to rotate with shaft 72. An endless belt 74 travels between the idler pulley 66 and the drive pulley 70 in the direction of the directional arrow. Along the external or outside surface of the belt 74 are a plurality of fruit-engaging troughs 76, generally U-shaped in transverse cross section which pick up the fruit removed from the vines by the picker rods 50 and 52. The fruit is urged towards the lateral outside edge of the bed member 20 by reciprocation of said bed member.

Each of the endless flight type elevators 62 and 64 discharges fruit carried upwardly thereby into a hopper or container 80 for conveyor 62 and 82 for conveyor 64. Each of the containers 80 and 82 has a discharge spout; 84 for container 80 and 86 for container 82, which discharge spouts may have closable doors not shown so that periodically the bins or containers 80 and 82 may be emptied into suitable boxes, cartons, baskets, trucks, or the like.

Beam 30 and its corresponding rear beam 31 may, as illustrated in the drawings, support platforms 200 and 202 which platforms extend rearwardly beyond the rearward extension of the main frame of the harvester so that the back portions of each of the platforms 200 and 202 are positioned directly below the outlets from spouts 84 and 86, connected to the lower ends of storage bins 80 and 82, whereby containers may be placed on the platforms 200 and 202 and receive the fruit as it is harvested by the machine.

The harvester, in the illustrated form of the invention, also includes a pair of forwardly extending arm members 90 and 92 which carry at their forward ends bearings for a shaft 94. The shaft 94 is driven by the drive mechanism to be hereinafter described. Between the bearing blocks for shaft 94 is secured a resilient, generally barrel-shaped wheel structure generally designated 96 with the lower peripheral surface of the wheel positioned just above the opening 26 betwen the pair of bed members and the position of forward attachment of the picker rods 50, 52, 54 and 56 of the harvester. The resilient barrel-shaped member aids in directing vines fed by the tines and brushes onto the picker bars to insure that fruit hanging from the vines comes into contact with the picker bars.

Drive mechanism for harvester

Figure 1:
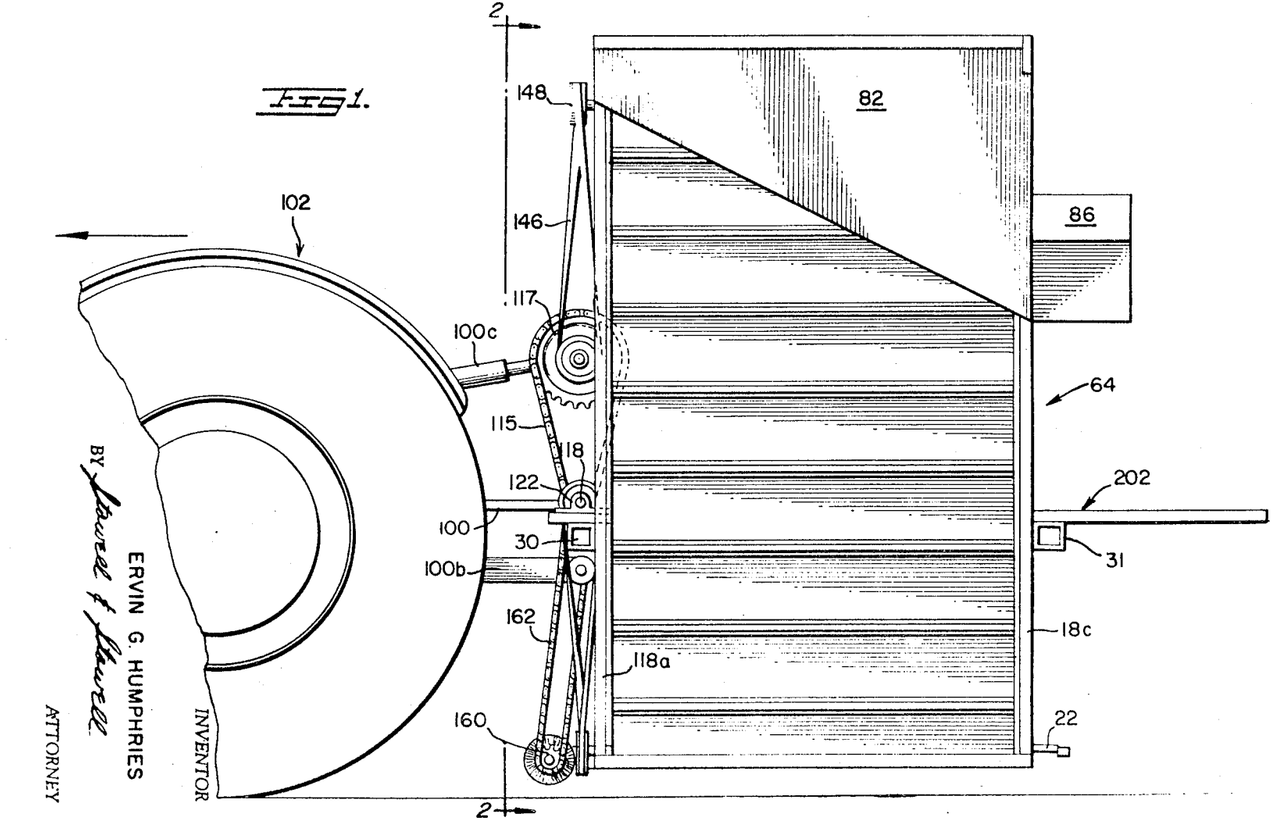
FIGURE 1 is a side elevation of the improved harvester.
Figure 2:
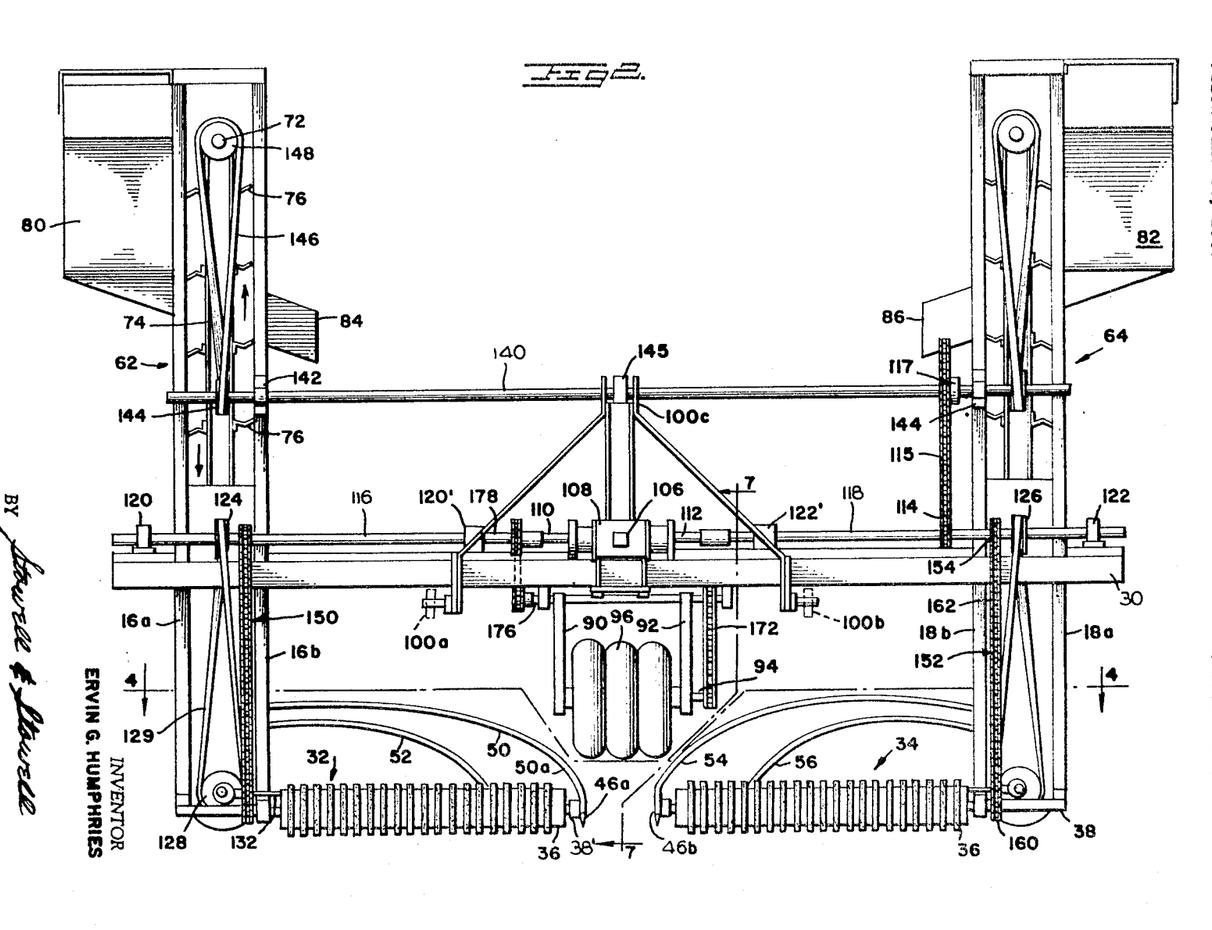
FIGURE 2 is a section on line 2—2 of FIGURE 1.
Figure 3:
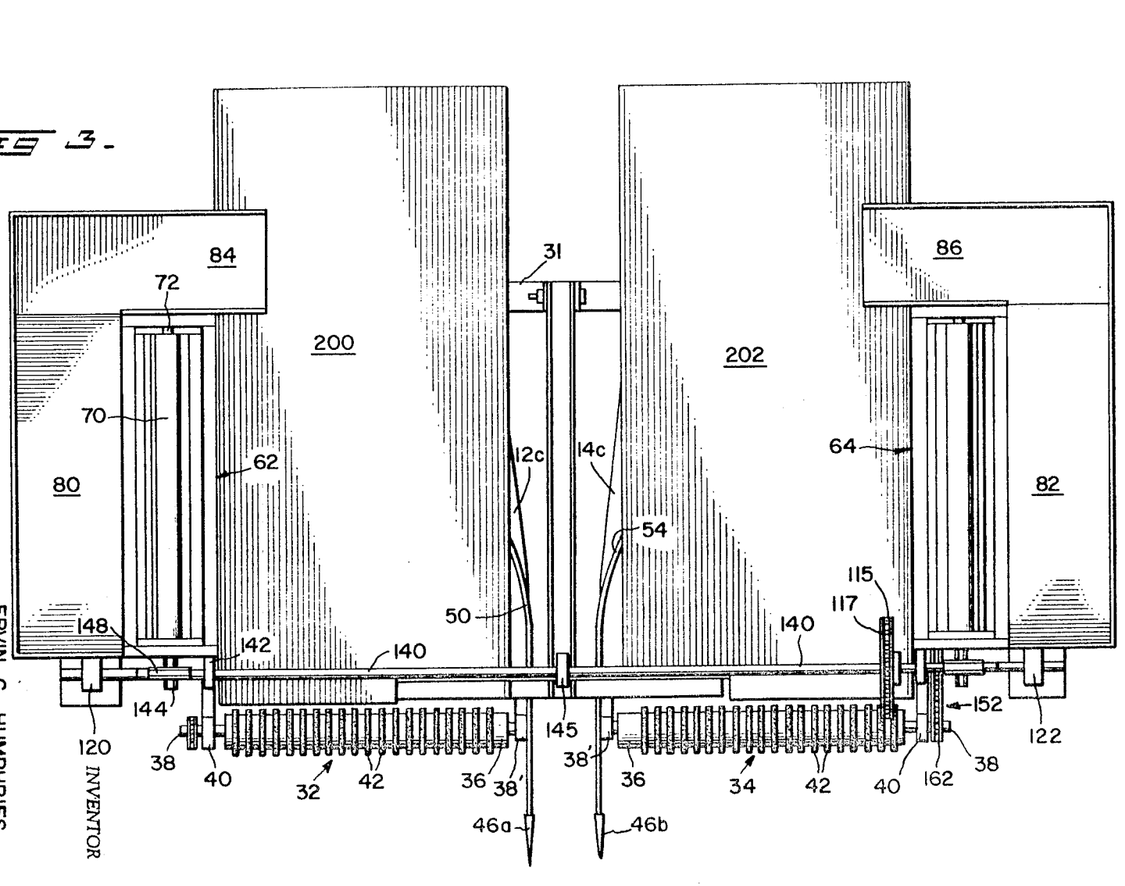
FIGURE 3 is a top view of the harvester.
Figure 4:
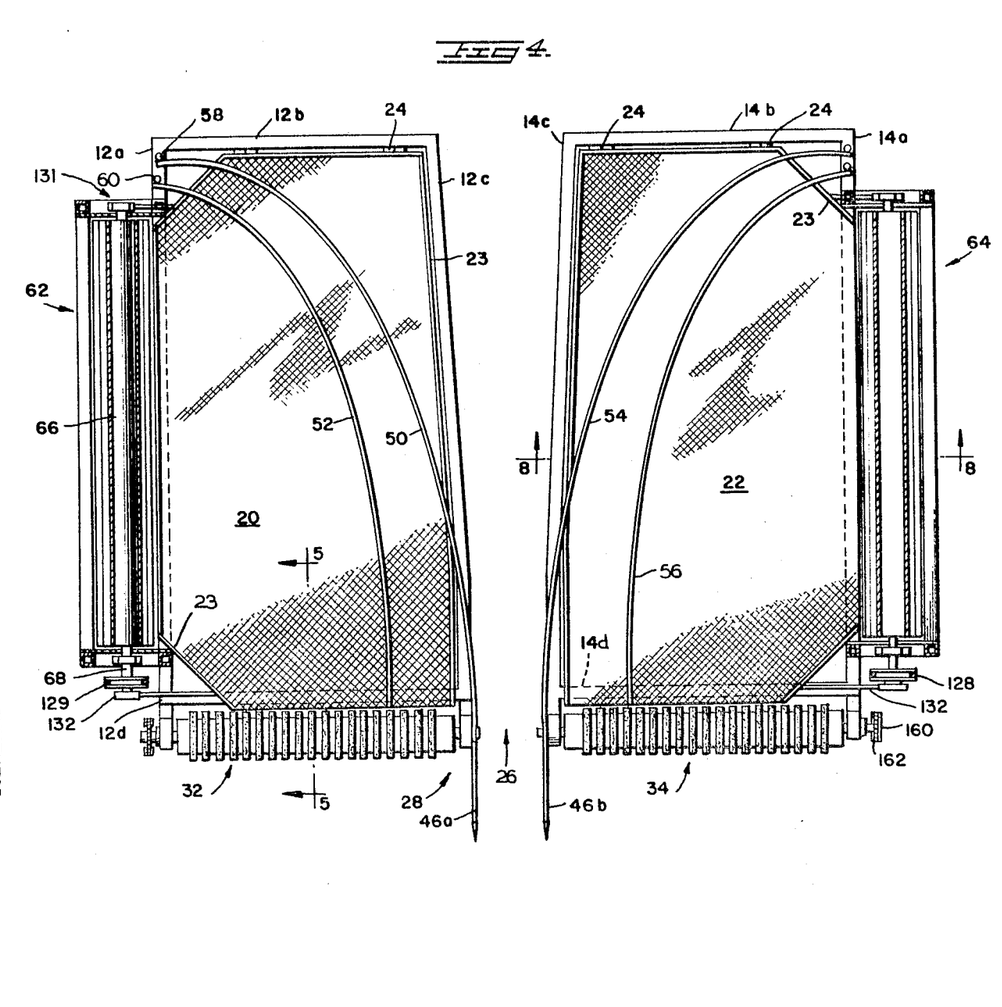
FIGURE 4 is a section on line 4—4 of FIGURE 2.
Figure 5:
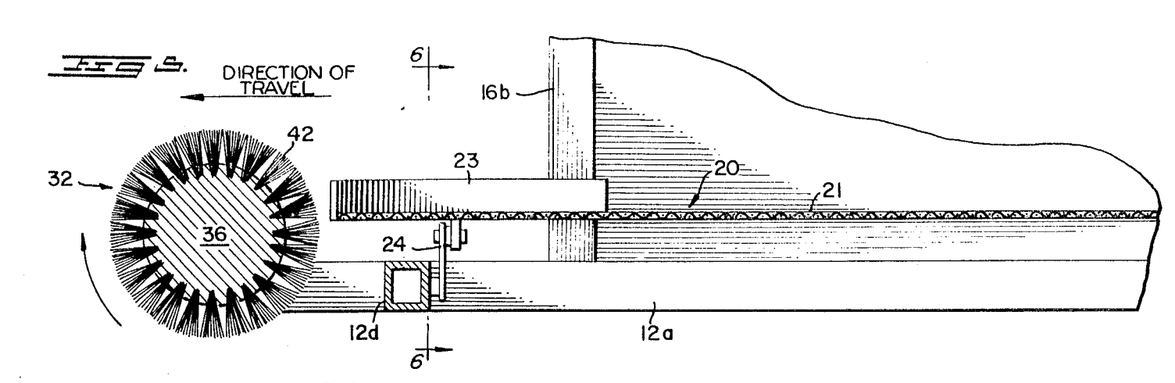
FIGURE 5 is a section on line 5—5 of FIGURE 4.
Figure 6:
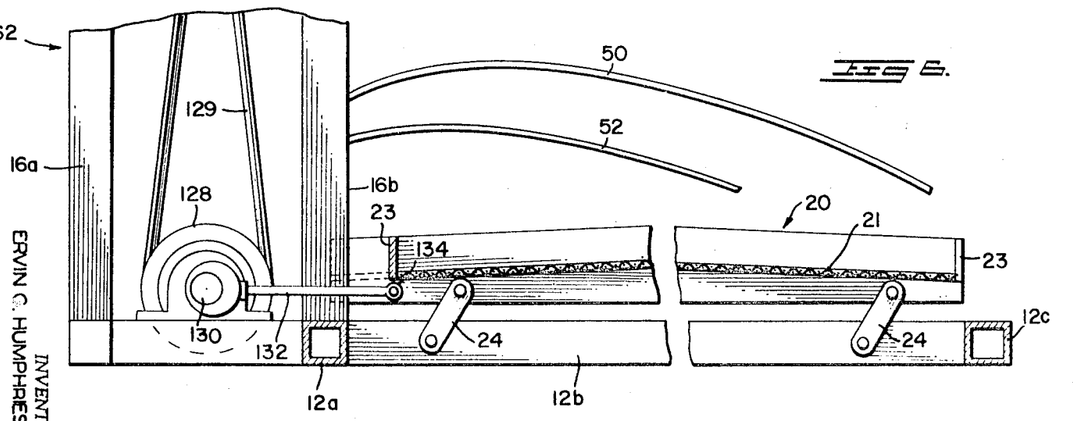
FIGURE 6 is a section on line 6—6 of FIGURE 5.

In the illustrated form of the invention the harvester per se has no ground-engaging wheels and the machine is supported by arm members 100a, b, and c extending from the rear end of the conventional farm tractor 102. The members 100a, b, and c form a conventional three-point or three-element suspension system commonly employed in the agricultural arts. Further, the tractor 102 provides the motive power for the various mechanisms of the harvester. A rear powered take-off shaft 100 extending rearwardly from the tractor is coupled at 106 to a two output shaft transmission 108. The transmission 108 has a pair of horizontal and oppositely directed output shafts 110 and 112 and shafts 110 and 112 drive shafts 116 and 118, the outboard ends of which are journaled in bearings 120 and 122 secured to the upper surface of horizontal beam 30 hereinbefore described. There are also corresponding inboard bearings 120' and 122' as indicated on FIGURE 2. Each of the shafts 116 and 118 has secured thereto a pulley 124 and 126, respectively. Pulley 124 drives a pulley 128 via belt 129, which pulley 128 is secured to the forward end of shaft 68. A similar arrangement of pulleys and belt are provided for the opposite side. At the most forward end of shaft 68, FIG. 6, is an eccentric 130 which drives a crank arm 132 having its extended end connected, as at 134, to the forward and outer corner of the bed member 20 whereby rotation of the shaft 68 causes the bed member 20 to reciprocate to thereby feed cucumbers or the like, deposited on the bed as they are picked from the vine by the rods 50 and 52, toward the endless flight conveyor 62.

The rearward end of shaft 68 has associated therewith a corresponding eccentric 131 which drives a corresponding crank arm whereby reciprocating motion is imparted to both the forward and rearward ends of the bed member 20. Similar drive mechanism for the opposite sided reciprocates bed 22.

Shaft 118, in addition to driving its bed member 22, also has a sprocket 114 secured thereto which sprocket is connected by a chain 115 to a sprocket 117 secured to rotate with a shaft 140. The shaft 140 is journaled, adjacent its outboard ends, in bearing means 142 and 144 and centrally in a bearing block 145. Between the vertical members 16a and 16b there is mounted a pulley 144 which pulley, through drive belt 146, drives pulley 148 connected to shaft 72, which shaft, as hereinbefore described, rotates the drive pulley 70 for conveyor 62. A similar belt and pulleys drive the opposite conveyor 64.

Each of the vine pick-up brushes 32 and 34 is rotated as hereinbefore described and power for the rotation thereof is obtained through the chain drives generally designated 150 and 152. Drive 152 drives brush 34 and the drive comprises a sprocket 154 secured to shaft 118 and a further sprocket 160 secured to shaft 38; the two sprockets being connected by chain 162. A similar drive for brush 32 is provided at the opposite side of the machine.

Figure 7:
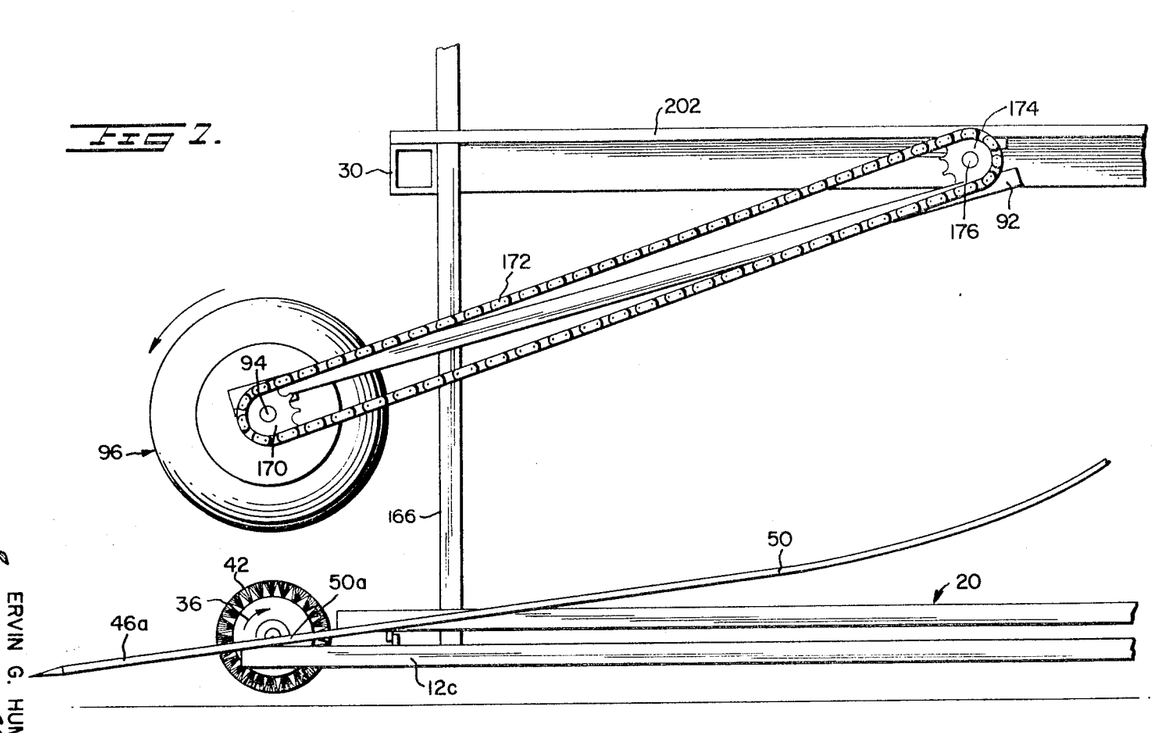
FIGURE 7 is a section on line 7—7 of FIGURE 2.

The barrel-like wheel element 96 is driven by a sprocket 170, FIG. 7, secured to one end of shaft 94. The sprocket 170 is connected by a chain 172 to a further sprocket 174 connected to a shaft 176 driven by twisted belt drive 178 via, for example, shaft 116.

By way of illustration, if the input speed to the transmission 108 is approximately 500 r.p.m. for a speed of 1.2 miles per hour of the vehicle over the ground, it has been found that a 1:1 speed ratio between the input shaft and the mechanism driving the shakers for beds 20 and 22 is very satisfactory.

A 2:1 reduction speed ratio for the brushes and the member 92 has been found to be satisfactory; whereas a 4:1 reduction in speed for the elevators is very satisfactory for an input of 500 r.p.m. to transmission 108.

OPERATION OF THE MACHINE

In general the principle of operation of the present harvester depends on relative movement between fruit hanging from vines and the picker rods of the harvester. Upon impact, forces are developed between a cucumber and the vine which exceed the yield point of the stem, thus separating the fruit from the vines.

The effectiveness of the picking or harvesting ability of the machine depends upon several factors such as the diameter of the picker rods, the weight and size of the cucumbers to be harvested, the relative velocity between the picker rods and the vines and the angle through which the vine is bent in passing through the harvesting device. The effectiveness of the harvester while dependent on the foregoing factors is particularly dependent upon the diameter of the picker rods and the weight and the size of the fruit to be picked. Rod diameters less than one quarter of an inch have been found to break the vines and in general cause excessive damage to the foliage. While very satisfactory results have been obtained with rods one quarter of an inch in diameter, effective harvesting can be provided where the picker rods have diameters in the order of one-fourth to about three-fourths inch when the vehicle carrying the rods is traveling or operating at speeds in the order of 1 to 2½ miles per hour forward velocity.

With the harvester attached to a conventional farm tractor and with the open space 26 positioned at the beginning of a row of cucumbers such that the heavy stem portions of the cucumber vines would pass through the opening and employing a pair of picker rods positioned diagonally over each of the fruit catching bed members and with the vehicle being towed approximately 1.5 miles per hour, the picking capability of the harvester is shown in Table I.

TABLE I

| Commercial grades | Diameter of cucumber | No. | No. picked | Percent picked |
|---|---|---|---|---|
| #1 | Less than 1⅛" | 104 | 65 | 62.5 |
| #2 | 1⅛" to 1½" | 133 | 99 | 74.4 |
| #3 | 1½" to 2" | 80 | 69 | 86.3 |
| #4 | Greater than 2" | 10 | 10 | 100.0 |
| Total | | 327 | 243 | 74.3 |

Examination of Table I shows that the larger the fruit, the higher the probability that it will be picked. This feature coupled with the growth characteristics of cucumbers is very significant, since as the fruit grows larger it has a progressively higher probability of being picked by successive harvests.

From the foregoing description it will be seen that the present invention fully accomplishes the aims and objects hereinbefore set forth.

While a preferred embodiment of the present invention has been specifically described hereinabove, it will be appreciated by those skilled in the art that various modifications may be made in the form of the apparatus without departing from the scope of the present claims. For example, while a pair of cucumber picking rods has been illustrated for each bed member, more than two, but at least one rod, may be used with the device. In the form of the apparatus illustrated only a single row harvester has been provided; where desired, a plural row machine may be provided by increasing the number of picking stations. Further, the device may be readily adapted to self-propelled operation.

I claim:

1. A harvester for vine growing fruit comprising a main frame consisting of a pair of laterally spaced generally horizontally disposed bed members, a fruit picking rod for each bed member, each of said picker rods extending from a low forward position adjacent the space between the bed members generally diagonally across their respective bed members to an upwardly and rearwardly spaced apart position.

2. The harvester defined in claim 1 wherein each bed member is provided with a pair of said picker rods which rods extend generally parallel to each other across each bed.

3. The harvester defined in claim 1 including a power driven pickup roll mounted for rotation across the leading or forward end of each of said bed members.

4. The invention defined in claim 3 including a vine control roller means mounted above said picker rods and vertically above the space between said bed members.

5. The invention defined in claim 4 wherein said vine control roller is rotated during operation of the machine.

6. The harvester for vine growing fruit as defined in claim 1 including conveyor means for moving fruit from each of said bed members to an elevated storage position.

7. The harvester defined in claim 6 wherein said fruit elevating means comprises an endless conveyor mounted along the lateral edge of each of said bed members remote from the space between the bed members.

8. The invention defined in claim 7 including means for reciprocating each of said bed members to urge the harvested fruit toward said elevators.

References Cited
UNITED STATES PATENTS

| | | | |
|---|---|---|---|
| 2,829,484 | 4/1958 | Gilbert | 56—327 |
| 2,893,193 | 7/1959 | Gilbert | 56—327 |
| 3,365,869 | 1/1968 | Whiteley | 56—327 |
| 3,386,236 | 6/1968 | Mitchell | 56—327 |

RUSSELL R. KINSEY, Primary Examiner